(12) United States Patent
Jarvinen et al.

(10) Patent No.: US 11,611,842 B2
(45) Date of Patent: Mar. 21, 2023

(54) SPATIAL AUGMENTATION

(71) Applicant: Nokia Technologies Oy, Espoo (FI)

(72) Inventors: Kari Juhani Jarvinen, Tampere (FI); Jussi Leppanen, Tampere (FI); Tapani Pihlajakuja, Vantaa (FI); Adriana Vasilache, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/258,829

(22) PCT Filed: Jul. 5, 2019

(86) PCT No.: PCT/FI2019/050532
§ 371 (c)(1),
(2) Date: Jan. 8, 2021

(87) PCT Pub. No.: WO2020/012066
PCT Pub. Date: Jan. 16, 2020

(65) Prior Publication Data
US 2021/0271315 A1 Sep. 2, 2021

(30) Foreign Application Priority Data

Jul. 13, 2018 (GB) .................................... 1811542

(51) Int. Cl.
*H04S 7/00* (2006.01)
*G06F 3/16* (2006.01)
*G06F 3/01* (2006.01)
*G06T 19/00* (2011.01)
*G10L 19/008* (2013.01)

(52) U.S. Cl.
CPC .............. *H04S 7/304* (2013.01); *G06F 3/165* (2013.01); *G06F 3/012* (2013.01); *G06T 19/003* (2013.01); *G10L 19/008* (2013.01)

(58) Field of Classification Search
CPC ....... G06F 3/165; G06F 16/60; G10L 19/008; H04S 7/304; H04S 2400/11; H04S 2400/15; H04S 2400/01; H04S 7/30; H04S 7/303–306; H04S 2400/13; H04S 2420/01; A63F 13/69; A63F 13/60; G06T 19/003; G06T 19/006; G06T 19/008
See application file for complete search history.

(56) References Cited

U.S. PATENT DOCUMENTS

| 10,237,675 B1 | 3/2019 | Valavanis |
| 2011/0051940 A1* | 3/2011 | Ishikawa ........... H04L 12/40013 381/22 |
| 2014/0133683 A1 | 5/2014 | Robinson et al. |

(Continued)

FOREIGN PATENT DOCUMENTS

| CN | 105075295 A | 11/2015 |
| CN | 107211227 A | 9/2017 |

(Continued)

*Primary Examiner* — Xuemei Zheng
(74) *Attorney, Agent, or Firm* — Harrington & Smith

(57) ABSTRACT

An apparatus including circuitry configured for: obtaining media content, wherein the media content includes at least one object data; obtaining priority content information, the priority content information including a priority identification identifying and classifying the at least one object; rendering the at least one object based on the priority content information.

20 Claims, 12 Drawing Sheets

(56) References Cited

U.S. PATENT DOCUMENTS

| | | | |
|---|---|---|---|
| 2017/0045941 A1* | 2/2017 | Tokubo | A63F 13/25 |
| 2018/0115850 A1* | 4/2018 | De Burgh | H04S 7/30 |
| 2018/0338215 A1* | 11/2018 | Eronen | H04S 7/303 |

FOREIGN PATENT DOCUMENTS

| | | |
|---|---|---|
| EP | 3 174 316 A1 | 5/2017 |
| EP | 3 255 905 A1 | 12/2017 |
| GB | 2 374 772 A | 10/2002 |
| WO | WO 2013/064914 A1 | 5/2013 |

\* cited by examiner

Figure 2

201: Service provider (or content creator) identifies priority object(s) at each scene, if any, and assigns them into priority classes. (This may be done e.g. based on legal requirements or to prioritize consumption of advertisements.)

203: Streaming server sends Priority Information (PI) from the streaming server to the renderer in the user equipment. The PI contains as minimum: (1) Object identifier (identifying which object this Priority Information is for) and (2) Priority class. In addition, other attributes may be signalled including: (3) Priority zone size/radius (and shape), (4) Trigger condition for the priority treatment, (5) Duration of the priority treatment, (6) Priority object effect when triggered, and (7) Effect on other objects when priority object triggered.

205: In addition to user orientation (3DoF and 6DoF) and position (6DoF), rendering will be based on the received Priority Information if at least one priority object is present in the scene. Rendering (as known in prior art) will thus be modified based on the Priority Information. Specific features to modify rendering based on Priority Information include: (1) Priority zones and associated processing, (2) Priority with parametric spatial audio (rendering groups of objects based e.g. on position and/or direction), and (3) Modification of other content during rendering of priority content.

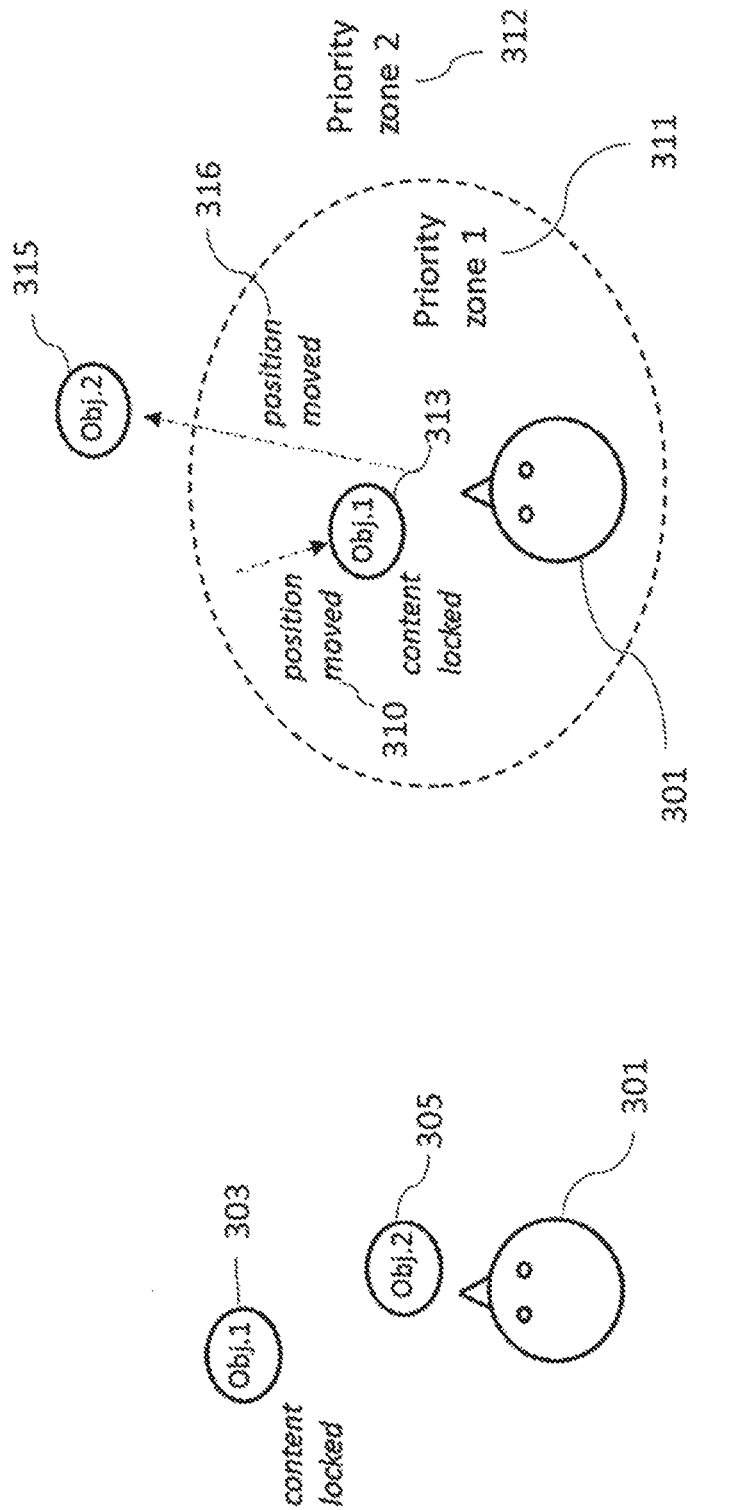

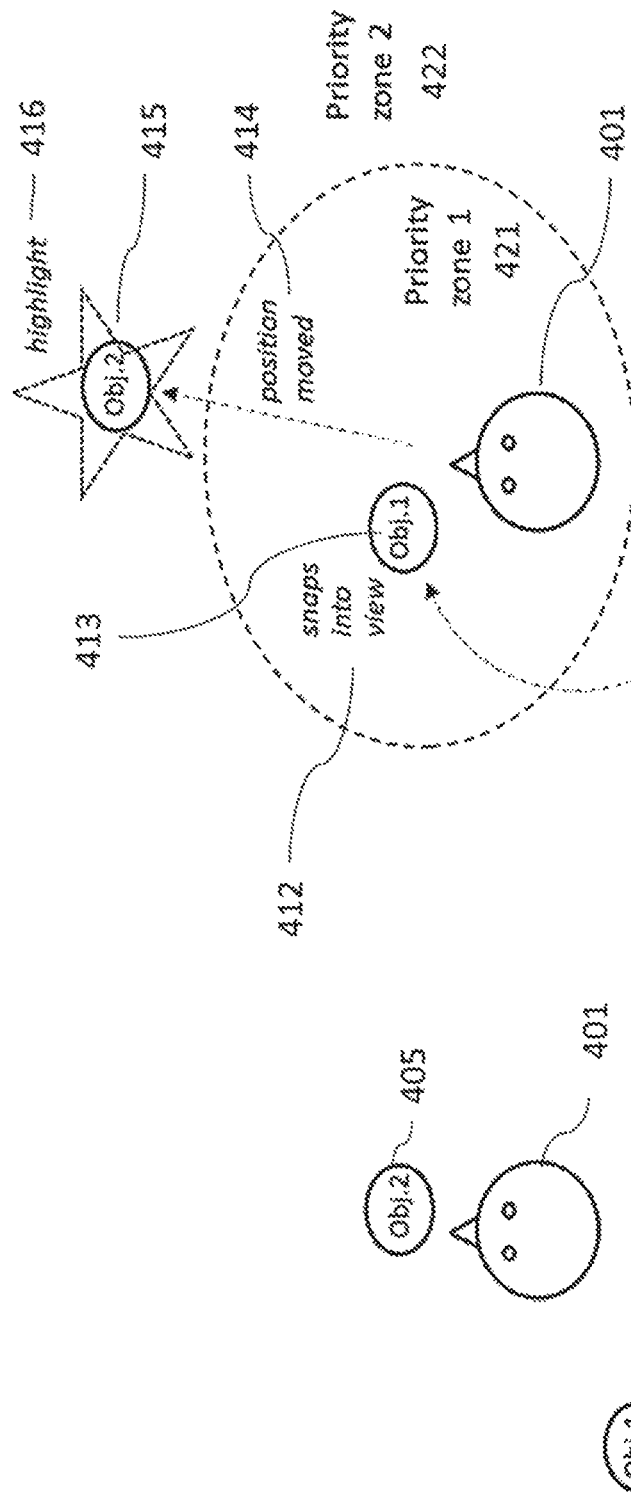

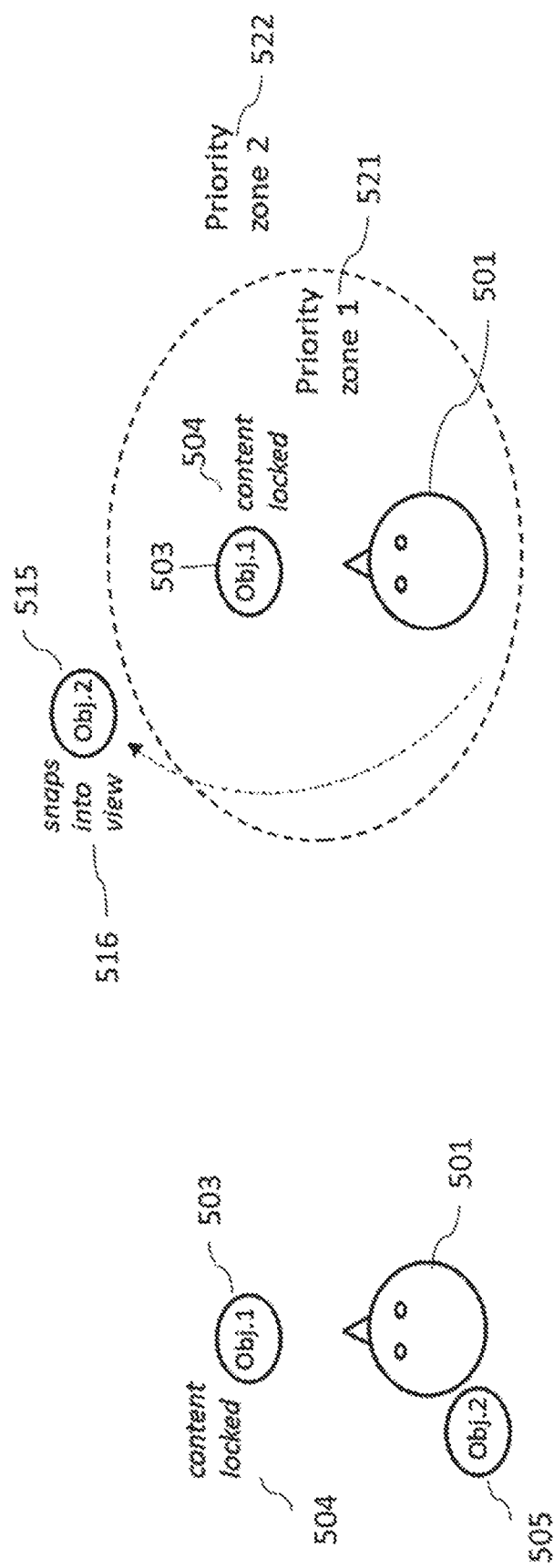

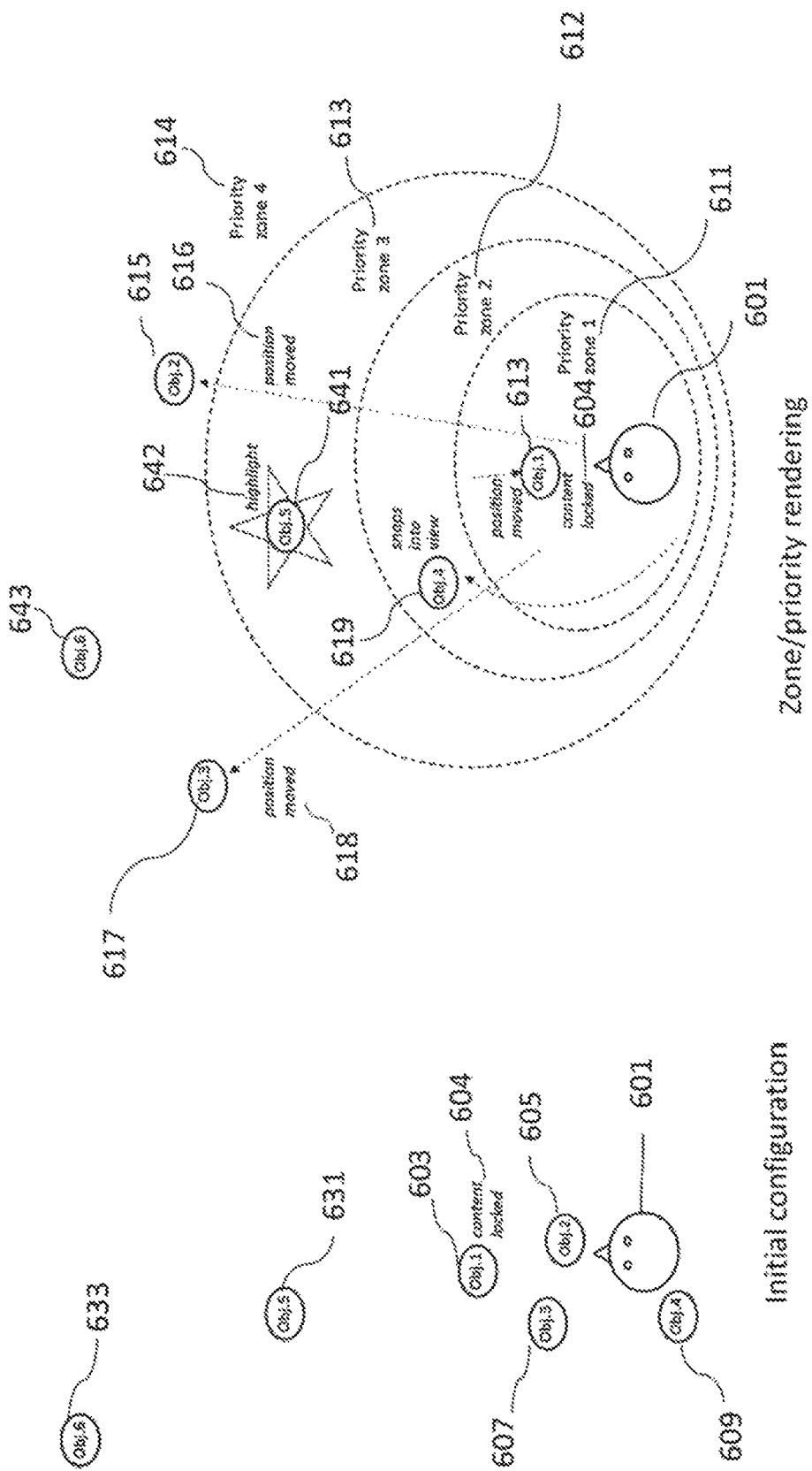

Figure 10

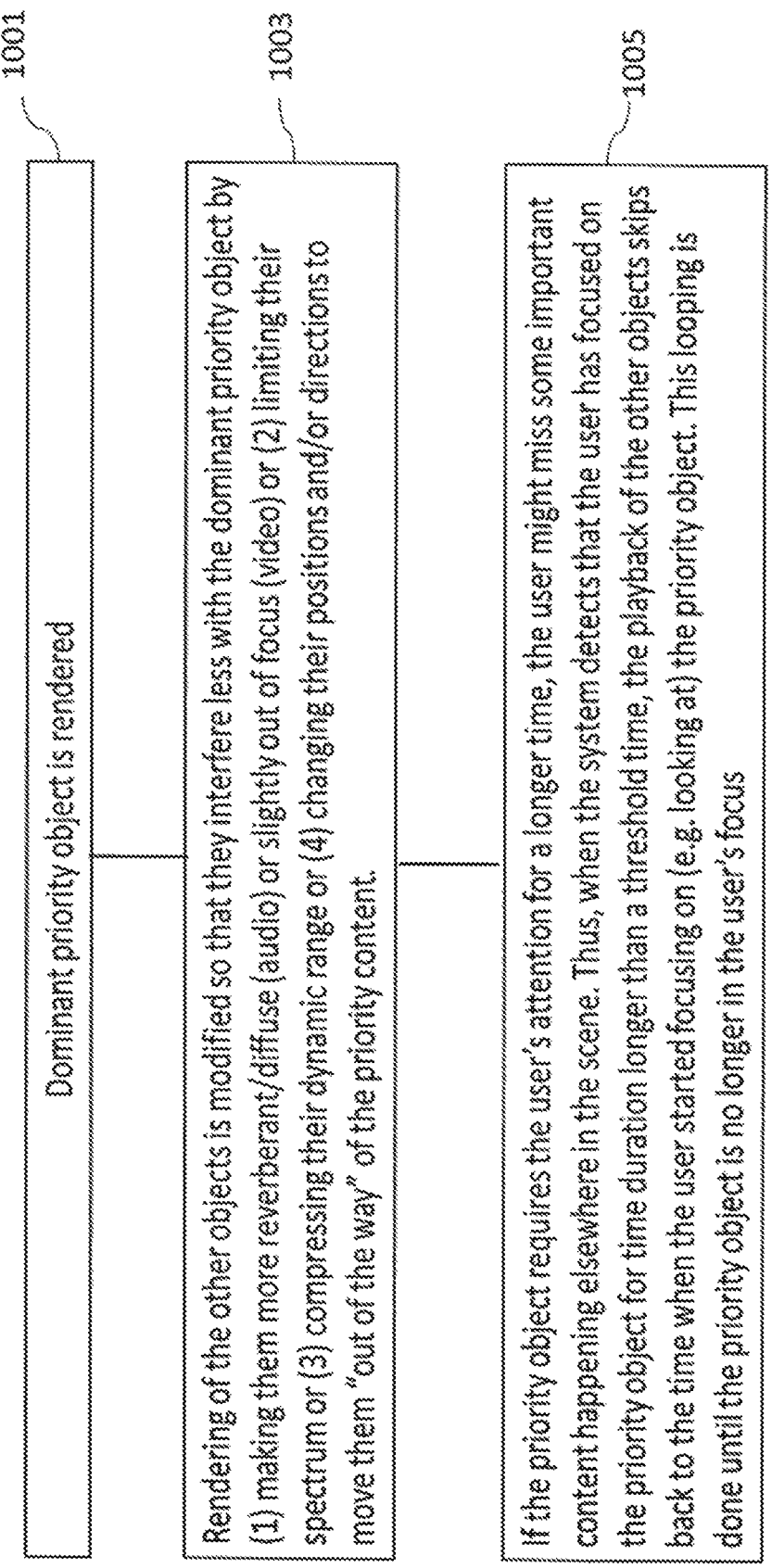

1001 — Dominant priority object is rendered

1003 — Rendering of the other objects is modified so that they interfere less with the dominant priority object by (1) making them more reverberant/diffuse (audio) or slightly out of focus (video) or (2) limiting their spectrum or (3) compressing their dynamic range or (4) changing their positions and/or directions to move them "out of the way" of the priority content.

1005 — If the priority object requires the user's attention for a longer time, the user might miss some important content happening elsewhere in the scene. Thus, when the system detects that the user has focused on the priority object for time duration longer than a threshold time, the playback of the other objects skips back to the time when the user started focusing on (e.g. looking at) the priority object. This looping is done until the priority object is no longer in the user's focus ically also includes the means for rendering an object differently based on its priority level.

SPATIAL AUGMENTATION

CROSS REFERENCE TO RELATED APPLICATION

This patent application is a U.S. National Stage application of International Patent Application Number PCT/FI2019/050532 filed Jul. 5, 2019, which is hereby incorporated by reference in its entirety, and claims priority to GB 1811542.8 filed Jul. 13, 2018.

FIELD

The present application relates to apparatus and methods for spatial augmentation, but not exclusively for spatial audio augmentation within an audio decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

6 degrees of freedom (6DoF) content capture and rendering is an example of an implemented augmented reality (AR)/virtual reality (VR) application. This for example may be where a content consuming user is permitted to both move in a rotational manner and a translational manner to explore their environment. Rotational movement is sufficient for a simple VR experience where the user may turn her head (pitch, yaw, and roll) to experience the space from a static point or along an automatically moving trajectory. Translational movement means that the user may also change the position of the rendering, i.e., move along the x, y, and z axes according to their wishes. As well as 6 degrees of freedom systems there are other degrees of freedom systems and the related experiences using the terms 3 degrees of freedom (3DoF) which covers only the rotational movement and 3DoF+ which falls somewhat between 3DoF and 6DoF and allows for some limited user movement (in other words it can be considered to implement a restricted 6DoF where the user is sitting down but can lean their head in various directions). MPEG is specifying immersive media (MPEG-I) with Phase 1a covering 3DoF, Phase 1b covering 3DoF+ and Phase 2 covering 6DoF.

SUMMARY

There is provided according to a first aspect an apparatus comprising means for: obtaining media content, wherein the media content comprises at least one object data; obtaining priority content information, the priority content information comprising a priority identification identifying and classifying the at least one object; rendering the at least one object based on the priority content information.

The media content may comprise at least one of: audio content; video content; and image content.

The at least one object data may comprise at least one spatial audio signal which defines an audio scene within which may be at least one audio signal object and the at least one spatial audio signal may be rendered consistent with a content consumer user movement.

The at least one object data may comprise at least one audio signal object.

The at least one spatial audio signal may define an audio scene.

The priority content information may comprise priority information identifying and classifying the at least one audio signal object.

The means for rendering the at least one object may be further for rendering the at least one audio signal object based on the priority content information.

The means for obtaining at least one spatial audio signal may be means for decoding from a first bit stream the at least one spatial audio signal comprising the at least one audio signal object.

The means for obtaining priority content information may be further for decoding from a first bit stream the priority content information.

The means for obtaining priority content information may be further for obtaining the priority content information from a user input.

The priority content information may comprise at least one of: an object identifier parameter for identifying which of the at least one object the priority Information is for; a priority class parameter for classifying at least one object with respect to identifying a rendering effect to be applied to the at least one object; a priority zone size parameter for defining a scene priority zone size associated with a rendering effect to be applied to the at least one object; a priority zone radius parameter for defining a scene priority zone radius associated with a rendering effect to be applied to the at least one object; a priority zone shape parameter for defining a scene priority zone shape associated with a rendering effect to be applied to the at least one object; a trigger condition parameter for defining at least one criteria to meet before applying a rendering effect to the at least one object; a duration parameter for defining a duration over which a rendering effect can be applied to the at least one object; a priority object effect parameter defining a rendering effect to be applied to the at least one object; and an other object effect parameter defining a rendering effect to be applied to the other objects from the at least one object when the rendering effect is applied to the at least one object.

The means for rendering the at least one object based on the priority content information may be further for: defining at least two zones; and rendering the at least one object within one of the at least two zones based on the priority content information.

The means for rendering the at least one object based on the priority content information may be further for moving the at least one object from one of the at least two zones to another of the at least two zones based on the priority content information.

The priority content information may comprise at least one of: a first level, wherein an object associated with the first level is content locked to a content consumer user's field of view; a second level, wherein an object associated with the second level is moved to a content consumer user's field of view; a third level, wherein an object associated with the third level is highlighted when in a content consumer user's field of view; and a fourth default level wherein an object associated with the fourth level is not modified based on its priority level.

According to a second aspect there is provided an apparatus comprising means for: obtaining media content, wherein the media content comprises at least one object data; obtaining priority content information, the priority content information comprising a priority identification identifying and classifying the at least one object; generating a data stream, the data stream comprising the media content and the priority content information, wherein the data stream is configured to be transmitted and/or retrieved by a renderer configured to render the at least one object based on the priority content information.

The media content may comprise at least one of: audio content; video content; and image content.

The at least one object data may comprise at least one spatial audio signal which defines an audio scene within which may be at least one audio signal object and the at least one spatial audio signal may be rendered consistent with a content consumer user movement.

The at least one object data may comprise at least one audio signal object.

The at least one spatial audio signal may define an audio scene.

The priority content information may comprise priority information identifying and classifying the at least one audio signal object.

The renderer may be configured to render the at least one audio signal object based on the priority content information.

The means for obtaining media content may be further for receiving from a content server the media content.

The means for obtaining priority content information is further for receiving from a priority identifier server the priority content information.

The priority content information may comprise at least one of: an object identifier parameter for identifying which of the at least one object the priority Information is for; a priority class parameter for classifying at least one object with respect to identifying a rendering effect to be applied to the at least one object; a priority zone size parameter for defining a scene priority zone size associated with a rendering effect to be applied to the at least one object; a priority zone radius parameter for defining a scene priority zone radius associated with a rendering effect to be applied to the at least one object; a priority zone shape parameter for defining a scene priority zone shape associated with a rendering effect to be applied to the at least one object; a trigger condition parameter for defining at least one criteria to meet before applying a rendering effect to the at least one object; a duration parameter for defining a duration over which a rendering effect can be applied to the at least one object; a priority object effect parameter defining a rendering effect to be applied to the at least one object; and an other object effect parameter defining a rendering effect to be applied to the other objects from the at least one object when the rendering effect is applied to the at least one object.

The priority content information may comprise at least one of: a first level, wherein an object associated with the first level is content locked to a content consumer user's field of view; a second level, wherein an object associated with the second level is moved to a content consumer user's field of view; a third level, wherein an object associated with the third level is highlighted when in a content consumer user's field of view; and a fourth default level wherein an object associated with the fourth level is not modified based on its priority level.

According to a third aspect there is provided an apparatus comprising means for: generating media content, wherein the media content comprises at least one object data; and/or obtaining priority content information, the priority content information comprising a priority identification identifying and classifying the at least one object; signalling the media content and/or the priority content information, wherein the media content and priority content information are configured to be transmitted to and/or retrieved by a renderer configured to render the at least one object based on the priority content information.

The media content may comprise at least one of: audio content; video content; and image content.

The at least one object data may comprise at least one spatial audio signal which defines an audio scene within which may be at least one audio signal object and the at least one spatial audio signal may be rendered consistent with a content consumer user movement.

The at least one object data may comprise at least one audio signal object. The at least one spatial audio signal may define an audio scene.

The means for obtaining priority content information may be further for obtaining priority content information comprising priority information identifying and classifying the at least one audio signal object, wherein the renderer may be configured to render the at least one audio signal object based on the priority content information.

The priority content information may comprise at least one of: an object identifier parameter for identifying which of the at least one object the priority Information is for; a priority class parameter for classifying at least one object with respect to identifying a rendering effect to be applied to the at least one object; a priority zone size parameter for defining a scene priority zone size associated with a rendering effect to be applied to the at least one object; a priority zone radius parameter for defining a scene priority zone radius associated with a rendering effect to be applied to the at least one object; a priority zone shape parameter for defining a scene priority zone shape associated with a rendering effect to be applied to the at least one object; a trigger condition parameter for defining at least one criteria to meet before applying a rendering effect to the at least one object; a duration parameter for defining a duration over which a rendering effect can be applied to the at least one object; a priority object effect parameter defining a rendering effect to be applied to the at least one object; and an other object effect parameter defining a rendering effect to be applied to the other objects from the at least one object when the rendering effect is applied to the at least one object.

The priority content information may comprise at least one of: a first level, wherein an object associated with the first level is content locked to a content consumer user's field of view; a second level, wherein an object associated with the second level is moved to a content consumer user's field of view; a third level, wherein an object associated with the third level is highlighted when in a content consumer user's field of view; and a fourth default level wherein an object associated with the fourth level is not modified based on its priority level. According to a fourth aspect there is provided a method comprising: obtaining media content, wherein the media content comprises at least one object data; obtaining priority content information, the priority content information comprising a priority identification identifying and classifying the at least one object; rendering the at least one object based on the priority content information.

The media content may comprise at least one of: audio content; video content; and image content.

The at least one object data may comprise at least one spatial audio signal which defines an audio scene within which may be at least one audio signal object and the at least one spatial audio signal may be rendered consistent with a content consumer user movement.

The at least one object data may comprise at least one audio signal object.

The at least one spatial audio signal may define an audio scene.

The priority content information may comprise priority information identifying and classifying the at least one audio signal object.

Rendering the at least one object may further comprise rendering the at least one audio signal object based on the priority content information.

Obtaining at least one spatial audio signal may further comprise decoding from a first bit stream the at least one spatial audio signal comprising the at least one audio signal object.

Obtaining priority content information may further comprise decoding from a first bit stream the priority content information.

Obtaining priority content information may further comprise obtaining the priority content information from a user input.

The priority content information may comprise at least one of: an object identifier parameter for identifying which of the at least one object the priority Information is for; a priority class parameter for classifying at least one object with respect to identifying a rendering effect to be applied to the at least one object; a priority zone size parameter for defining a scene priority zone size associated with a rendering effect to be applied to the at least one object; a priority zone radius parameter for defining a scene priority zone radius associated with a rendering effect to be applied to the at least one object; a priority zone shape parameter for defining a scene priority zone shape associated with a rendering effect to be applied to the at least one object; a trigger condition parameter for defining at least one criteria to meet before applying a rendering effect to the at least one object; a duration parameter for defining a duration over which a rendering effect can be applied to the at least one object; a priority object effect parameter defining a rendering effect to be applied to the at least one object; and an other object effect parameter defining a rendering effect to be applied to the other objects from the at least one object when the rendering effect is applied to the at least one object.

Rendering the at least one object based on the priority content information may further comprise: defining at least two zones; and rendering the at least one object within one of the at least two zones based on the priority content information.

Rendering the at least one object based on the priority content information may further comprise moving the at least one object from one of the at least two zones to another of the at least two zones based on the priority content information.

The priority content information may comprise at least one of: a first level, wherein an object associated with the first level is content locked to a content consumer user's field of view; a second level, wherein an object associated with the second level is moved to a content consumer user's field of view; a third level, wherein an object associated with the third level is highlighted when in a content consumer user's field of view; and a fourth default level wherein an object associated with the fourth level is not modified based on its priority level.

According to a fifth aspect there is provided a method: obtaining media content, wherein the media content comprises at least one object data; obtaining priority content information, the priority content information comprising a priority identification identifying and classifying the at least one object; generating a data stream, the data stream comprising the media content and the priority content information, wherein the data stream is configured to be transmitted and/or retrieved by a renderer configured to render the at least one object based on the priority content information.

The media content may comprise at least one of: audio content; video content; and image content.

The at least one object data may comprise at least one spatial audio signal which defines an audio scene within which may be at least one audio signal object and the at least one spatial audio signal may be rendered consistent with a content consumer user movement.

The at least one object data may comprise at least one audio signal object.

The at least one spatial audio signal may define an audio scene.

The priority content information may comprise priority information identifying and classifying the at least one audio signal object.

The renderer may be configured to render the at least one audio signal object based on the priority content information.

Obtaining media content may further comprise receiving from a content server the media content.

Obtaining priority content information may further comprise receiving from a priority identifier server the priority content information.

The priority content information may comprise at least one of: an object identifier parameter for identifying which of the at least one object the priority Information is for; a priority class parameter for classifying at least one object with respect to identifying a rendering effect to be applied to the at least one object; a priority zone size parameter for defining a scene priority zone size associated with a rendering effect to be applied to the at least one object; a priority zone radius parameter for defining a scene priority zone radius associated with a rendering effect to be applied to the at least one object; a priority zone shape parameter for defining a scene priority zone shape associated with a rendering effect to be applied to the at least one object; a trigger condition parameter for defining at least one criteria to meet before applying a rendering effect to the at least one object; a duration parameter for defining a duration over which a rendering effect can be applied to the at least one object; a priority object effect parameter defining a rendering effect to be applied to the at least one object; and an other object effect parameter defining a rendering effect to be applied to the other objects from the at least one object when the rendering effect is applied to the at least one object.

The priority content information may comprise at least one of: a first level, wherein an object associated with the first level is content locked to a content consumer user's field of view; a second level, wherein an object associated with the second level is moved to a content consumer user's field of view; a third level, wherein an object associated with the third level is highlighted when in a content consumer user's field of view; and a fourth default level wherein an object associated with the fourth level is not modified based on its priority level.

According to a sixth aspect there is provided a method comprising: generating media content, wherein the media content comprises at least one object data; and/or obtaining priority content information, the priority content information comprising a priority identification identifying and classifying the at least one object; signalling the media content and/or the priority content information, wherein the media content and priority content information are configured to be transmitted to and/or retrieved by a renderer configured to render the at least one object based on the priority content information.

The media content may comprise at least one of: audio content; video content; and image content.

The at least one object data may comprise at least one spatial audio signal which defines an audio scene within which may be at least one audio signal object and the at least one spatial audio signal may be rendered consistent with a content consumer user movement.

The at least one object data may comprise at least one audio signal object,

The at least one spatial audio signal may define an audio scene.

Obtaining priority content information may further comprise obtaining priority content information comprising priority information identifying and classifying the at least one audio signal object, wherein the renderer may be configured to render the at least one audio signal object based on the priority content information.

The priority content information may comprise at least one of: an object identifier parameter for identifying which of the at least one object the priority Information is for; a priority class parameter for classifying at least one object with respect to identifying a rendering effect to be applied to the at least one object; a priority zone size parameter for defining a scene priority zone size associated with a rendering effect to be applied to the at least one object; a priority zone radius parameter for defining a scene priority zone radius associated with a rendering effect to be applied to the at least one object; a priority zone shape parameter for defining a scene priority zone shape associated with a rendering effect to be applied to the at least one object; a trigger condition parameter for defining at least one criteria to meet before applying a rendering effect to the at least one object; a duration parameter for defining a duration over which a rendering effect can be applied to the at least one object; a priority object effect parameter defining a rendering effect to be applied to the at least one object; and an other object effect parameter defining a rendering effect to be applied to the other objects from the at least one object when the rendering effect is applied to the at least one object.

The priority content information may comprise at least one of: a first level, wherein an object associated with the first level is content locked to a content consumer user's field of view; a second level, wherein an object associated with the second level is moved to a content consumer user's field of view; a third level, wherein an object associated with the third level is highlighted when in a content consumer user's field of view; and a fourth default level wherein an object associated with the fourth level is not modified based on its priority level.

According to a seventh aspect there is provided an apparatus comprising at least one processor and at least one memory including a computer program code, the at least one memory and the computer program code configured to, with the at least one processor, cause the apparatus at least to: obtain media content, wherein the media content comprises at least one object data; obtain priority content information, the priority content information comprising a priority identification identifying and classifying the at least one object; render the at least one object based on the priority content information.

The media content may comprise at least one of: audio content; video content; and image content.

The at least one object data may comprise at least one spatial audio signal which defines an audio scene within which may be at least one audio signal object and the at least one spatial audio signal may be rendered consistent with a content consumer user movement.

The at least one object data may comprise at least one audio signal object.

The at least one spatial audio signal may define an audio scene.

The priority content information may comprise priority information identifying and classifying the at least one audio signal object.

The apparatus caused to render the at least one object may be further caused to render the at least one audio signal object based on the priority content information.

The apparatus caused to obtain at least one spatial audio signal may be further caused to decode from a first bit stream the at least one spatial audio signal comprising the at least one audio signal object.

The apparatus caused to obtain priority content information may be further caused to decode from a first bit stream the priority content information.

The apparatus caused to obtain priority content information may be further caused to obtain the priority content information from a user input.

The priority content information may comprise at least one of: an object identifier parameter for identifying which of the at least one object the priority Information is for; a priority class parameter for classifying at least one object with respect to identifying a rendering effect to be applied to the at least one object; a priority zone size parameter for defining a scene priority zone size associated with a rendering effect to be applied to the at least one object; a priority zone radius parameter for defining a scene priority zone radius associated with a rendering effect to be applied to the at least one object; a priority zone shape parameter for defining a scene priority zone shape associated with a rendering effect to be applied to the at least one object; a trigger condition parameter for defining at least one criteria to meet before applying a rendering effect to the at least one object; a duration parameter for defining a duration over which a rendering effect can be applied to the at least one object; a priority object effect parameter defining a rendering effect to be applied to the at least one object; and an other object effect parameter defining a rendering effect to be applied to the other objects from the at least one object when the rendering effect is applied to the at least one object.

The apparatus caused to render the at least one object based on the priority content information may be further caused to: define at least two zones; and render the at least one object within one of the at least two zones based on the priority content information.

The apparatus caused to render the at least one object based on the priority content information may be further caused to move the at least one object from one of the at least two zones to another of the at least two zones based on the priority content information.

The priority content information may comprise at least one of: a first level, wherein an object associated with the first level is content locked to a content consumer user's field of view; a second level, wherein an object associated with the second level is moved to a content consumer user's field of view; a third level, wherein an object associated with the third level is highlighted when in a content consumer user's field of view; and a fourth default level wherein an object associated with the fourth level is not modified based on its priority level.

According to an eighth aspect there is provided an apparatus comprising at least one processor and at least one memory including a computer program code, the at least one memory and the computer program code configured to, with the at least one processor, cause the apparatus at least to: obtain media content, wherein the media content comprises at least one object data; obtain priority content information, the priority content information comprising a priority identification identifying and classifying the at least one object; generate a data stream, the data stream comprising the media content and the priority content information, wherein the data stream is configured to be transmitted and/or retrieved by a renderer configured to render the at least one object based on the priority content information.

The media content may comprise at least one of: audio content; video content; and image content.

The at least one object data may comprise at least one spatial audio signal which defines an audio scene within which may be at least one audio signal object and the at least one spatial audio signal may be rendered consistent with a content consumer user movement.

The at least one object data may comprise at least one audio signal object.

The at least one spatial audio signal may define an audio scene.

The priority content information may comprise priority information identifying and classifying the at least one audio signal object.

The renderer may be configured to render the at least one audio signal object based on the priority content information.

The apparatus caused to obtain media content may be further caused to receive from a content server the media content.

The apparatus caused to obtain priority content information may be further caused to receive from a priority identifier server the priority content information.

The priority content information may comprise at least one of: an object identifier parameter for identifying which of the at least one object the priority Information is for; a priority class parameter for classifying at least one object with respect to identifying a rendering effect to be applied to the at least one object; a priority zone size parameter for defining a scene priority zone size associated with a rendering effect to be applied to the at least one object; a priority zone radius parameter for defining a scene priority zone radius associated with a rendering effect to be applied to the at least one object; a priority zone shape parameter for defining a scene priority zone shape associated with a rendering effect to be applied to the at least one object; a trigger condition parameter for defining at least one criteria to meet before applying a rendering effect to the at least one object; a duration parameter for defining a duration over which a rendering effect can be applied to the at least one object; a priority object effect parameter defining a rendering effect to be applied to the at least one object; and an other object effect parameter defining a rendering effect to be applied to the other objects from the at least one object when the rendering effect is applied to the at least one object.

The priority content information may comprise at least one of: a first level, wherein an object associated with the first level is content locked to a content consumer user's field of view; a second level, wherein an object associated with the second level is moved to a content consumer user's field of view; a third level, wherein an object associated with the third level is highlighted when in a content consumer user's field of view; and a fourth default level wherein an object associated with the fourth level is not modified based on its priority level.

According to a ninth aspect there is provided an apparatus comprising at least one processor and at least one memory including a computer program code, the at least one memory and the computer program code configured to, with the at least one processor, cause the apparatus at least to: generate media content, wherein the media content comprises at least one object data; and/or obtain priority content information, the priority content information comprising a priority identification identifying and classifying the at least one object; signal the media content and/or the priority content information, wherein the media content and priority content information are configured to be transmitted to and/or retrieved by a renderer configured to render the at least one object based on the priority content information.

The media content may comprise at least one of: audio content; video content; and image content.

The at least one object data may comprise at least one spatial audio signal which defines an audio scene within which may be at least one audio signal object and the at least one spatial audio signal may be rendered consistent with a content consumer user movement.

The at least one object data may comprise at least one audio signal object.

The at least one spatial audio signal may define an audio scene.

The apparatus caused to obtain priority content information may be further caused to obtain priority content information comprising priority information identifying and classifying the at least one audio signal object, wherein the renderer may be configured to render the at least one audio signal object based on the priority content information.

The priority content information may comprise at least one of: an object identifier parameter for identifying which of the at least one object the priority Information is for; a priority class parameter for classifying at least one object with respect to identifying a rendering effect to be applied to the at least one object; a priority zone size parameter for defining a scene priority zone size associated with a rendering effect to be applied to the at least one object; a priority zone radius parameter for defining a scene priority zone radius associated with a rendering effect to be applied to the at least one object; a priority zone shape parameter for defining a scene priority zone shape associated with a rendering effect to be applied to the at least one object; a trigger condition parameter for defining at least one criteria to meet before applying a rendering effect to the at least one object; a duration parameter for defining a duration over which a rendering effect can be applied to the at least one object; a priority object effect parameter defining a rendering effect to be applied to the at least one object; and an other object effect parameter defining a rendering effect to be applied to the other objects from the at least one object when the rendering effect is applied to the at least one object.

The priority content information may comprise at least one of: a first level, wherein an object associated with the first level is content locked to a content consumer user's field of view; a second level, wherein an object associated with the second level is moved to a content consumer user's field of view; a third level, wherein an object associated with the third level is highlighted when in a content consumer user's field of view; and a fourth default level wherein an object associated with the fourth level is not modified based on its priority level. According to a tenth aspect there is provided a computer program comprising instructions [or a computer readable medium comprising program instructions] for causing an apparatus to perform at least the following: obtaining media content, wherein the media content comprises at least one object data; obtaining priority content information, the priority content information comprising a priority identification identifying and classifying the at least one object; rendering the at least one object based on the priority content information.

According to an eleventh aspect there is provided a computer program comprising instructions [or a computer readable medium comprising program instructions] for causing an apparatus to perform at least the following: obtaining media content, wherein the media content comprises at least one object data; obtaining priority content information, the priority content information comprising a priority identification identifying and classifying the at least one object; generating a data stream, the data stream comprising the media content and the priority content information, wherein the data stream is configured to be transmitted and/or retrieved by a renderer configured to render the at least one object based on the priority content information.

According to a twelfth aspect there is provided a computer program comprising instructions [or a computer readable medium comprising program instructions] for causing an apparatus to perform at least the following: generating media content, wherein the media content comprises at least one object data; and/or obtaining priority content information, the priority content information comprising a priority identification identifying and classifying the at least one object; signalling the media content and/or the priority content information, wherein the media content and priority content information are configured to be transmitted to and/or retrieved by a renderer configured to render the at least one object based on the priority content information.

According to a thirteenth aspect there is provided a non-transitory computer readable medium comprising program instructions for causing an apparatus to perform at least the following: obtaining media content, wherein the media content comprises at least one object data; obtaining priority content information, the priority content information comprising a priority identification identifying and classifying the at least one object; rendering the at least one object based on the priority content information.

According to a fourteenth aspect there is provided a non-transitory computer readable medium comprising program instructions for causing an apparatus to perform at least the following: obtaining media content, wherein the media content comprises at least one object data; obtaining priority content information, the priority content information comprising a priority identification identifying and classifying the at least one object; generating a data stream, the data stream comprising the media content and the priority content information, wherein the data stream is configured to be transmitted and/or retrieved by a renderer configured to render the at least one object based on the priority content information.

According to a fifteenth aspect there is provided a non-transitory computer readable medium comprising program instructions for causing an apparatus to perform at least the following: generating media content, wherein the media content comprises at least one object data; and/or obtaining priority content information, the priority content information comprising a priority identification identifying and classifying the at least one object; signalling the media content and/or the priority content information, wherein the media content and priority content information are configured to be transmitted to and/or retrieved by a renderer configured to render the at least one object based on the priority content information.

According to a thirteenth aspect there is provided a computer readable medium comprising program instructions for causing an apparatus to perform the methods as described above.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which:

FIG. 2 shows a flow diagram of the operation of the system as shown in FIG. 1 according to some embodiments;

FIGS. 3a, 3b, 4a, 4b, 5a, 5b, 6a and 6b show schematically example priority signalling audio source rendering according to some embodiments;

FIG. 10 shows a flow diagram of the operation of the system as shown in FIG. 1 implementing modification of other content during rendering of dominant priority content according to some embodiments;

EMBODIMENTS OF THE APPLICATION

Figure 1:
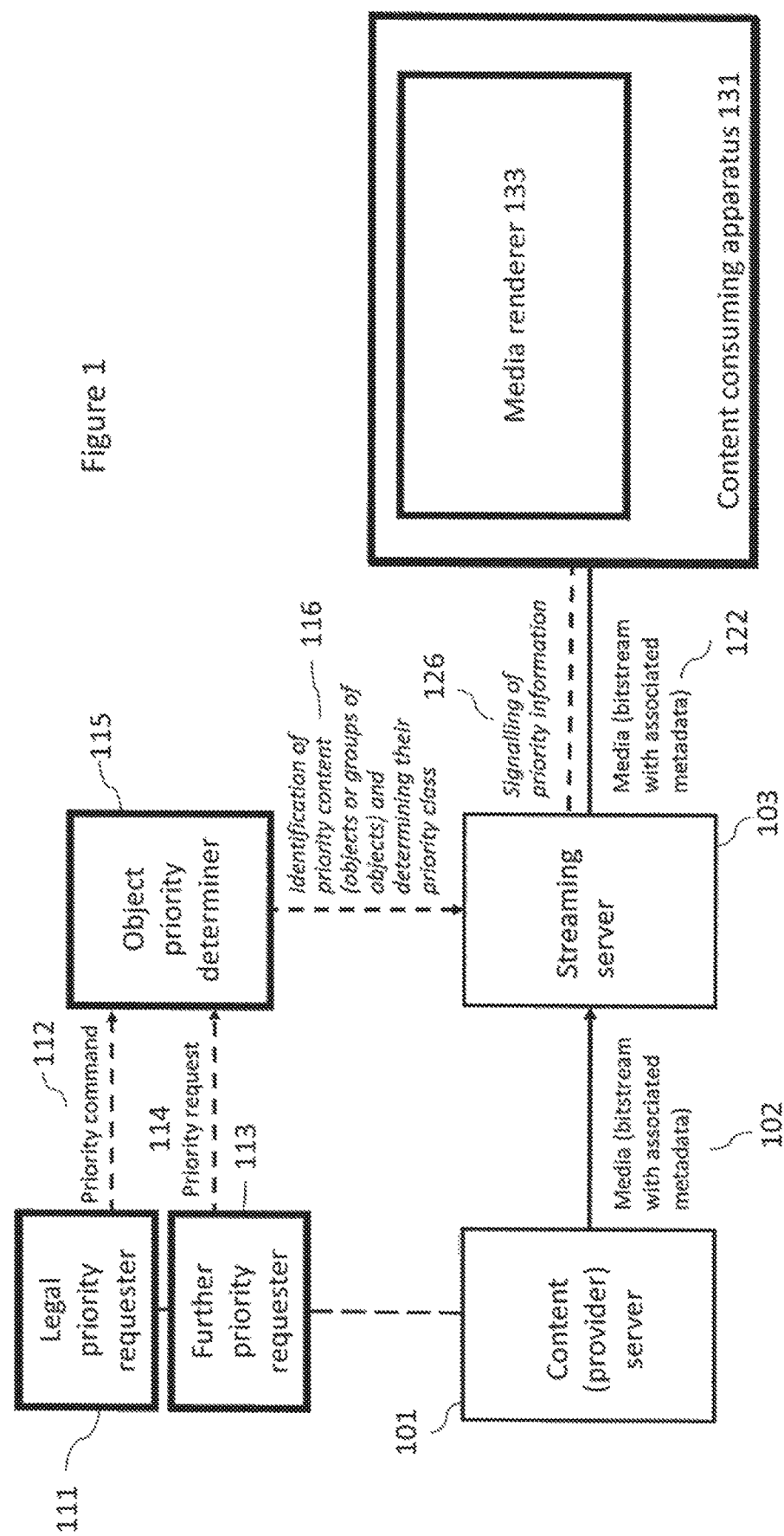
FIG. 1 shows schematically a system of apparatus suitable for implementing some embodiments.

The following describes in further detail suitable apparatus and possible mechanisms for the provision of effective rendering of audio objects with varying priority.

The rendering of spatial audio signals (for example immersive media) is impacted by head rotation and lateral movement giving the content consumer user a choice what they will hear and see. However, a service provider (or content creator) may in some cases want to limit the freedom of movement of rendering to make sure a content consumer user experiences an important content item such as a legal notice or important instruction item detailing a critical safety issue.

A brute force approach would typically be to limit user head rotation and lateral movement temporarily to force the content consumer user to experience the item but with a compromise to the feeling of immersion and the user experience.

A better approach is to allow the user to continue consuming immersive media uninterrupted but instead impact the rendering of the important objects so that the user is unable to avoid consuming them. For example "content locking" has been suggested where a change in user orientation or position has no impact to the rendering of particular media objects (in other words content which is 'locked').

Some embodiments as discussed herein improve on content locking and produce advantages in particular in 6DoF audio environments which are more complex and real-world-like than 3DoF or 3DoF+ environments.

For example, some embodiments have an advantage in that they do not lock all content. By forcing the user to hear and/or see locked advertisement that the content consumer user is not interested in (and from which there is no escape), may irritate the user to the point of stopping using the service/scene altogether while the user will be more patient for legal notices which he understands to be mandatory.

Furthermore, in some embodiments there is an advantage in that locked content is not hidden or overridden by other (unlocked) content. For example, in some embodiments the system is configured such that a loud unlocked audio object located very close to the user does not block a priority audio object. This may happen especially in 6DoF environments where the user is able to move freely and thus may go very close to objects to examine in detail. Furthermore, in 6DoF systems the users may even intentionally go close to unlocked objects (positioning a loud/large unlocked object in-between themselves and the mandatory locked object) to block the mandatory object being heard or seen.

In some embodiments the importance of content can depend, not only on the specific audio or visual objects, but also on the position and/or direction of the content. For example, in some embodiments the content creator may want to prioritize rendering all objects located at a certain direction or position (for example to highlight a selection of items rather than only an individual item).

Additionally, in some embodiments the system is configured such that rendering is distance dependent. Thus, for example when rendering is impacted remotely from the streaming server, user actions may have only a limited impact to rendering. Furthermore, the embodiments as described herein may be configured to enable rendering such that any priority content is not allowed to dominate the perception (e.g. locked content occupies significant part of the view or the entire view) significantly. The more degrees of freedom the user has (e.g. 6DoF vs. 3DoF) the more irritating this will be and the easier the user may lose interest to continue with the service altogether. For example, the embodiments may be configured to prevent the priority content blocking a significant experience and making movement in the 3D space tedious as user is deafened and has "blind" areas in his visual field.

The concept as described in further detail herein relates to rendering of immersive media in virtual reality (VR), augmented reality (AR) or mixed reality (MR) contexts wherein the apparatus and methods described herein provide the ability to signal priority information and describe associated processing in rendering to enable service provider (or content creator) to control rendering of any important objects (audio and/or visual but not limited to these). Such priority media objects may be for example legal announcements, advertisements, safety or other important information.

Furthermore the embodiments as described in further detail describe the signaling of priority information and parameters associated with media content. The media content comprising at least one object data identifying 'objects' within the content such as video content, audio content and image content.

With respect to FIG. 1 an example apparatus and system for implementing embodiments of the application are shown. The system is shown with a content provider server 101, a streaming server 103, a legal priority requester 111, a further priority requester 114, an object priority determiner 115, and content consumer apparatus 131.

A content (provider) server 101 may be configured to generate and/or store suitable content. The content may comprise objects (which may be visual, e.g., video or image, objects and/or audio objects) and which may be located within a 6DoF (or alternatively a 3DoF+ or 3DoF) environment. The content server 101 may be configured to output the content 102 to a suitable streaming server 103.

Furthermore, the system may comprise one or more priority requesters. In the example shown in FIG. 1 there are shown a legal priority requester 111 which is configured to generate a legal priority request and assign it to one or more further generated content object. The legal priority requester 111 may furthermore be configured to associate a legal priority request to one or more of the currently generated content objects. This request 112 may be passed to an object priority determiner 115.

There is also shown in FIG. 1 a further priority requester 113 which is configured to generate a further type priority request and assign it to one or more further generated content object. The further priority requester 113 may furthermore be configured to associate a further type priority request to one or more of the currently generated content objects. This request 114 may be passed to an object priority determiner 115.

The system may comprise the object priority determiner 115 which is configured to receive the priority requests, for example from the legal and further type priority requestors and identify and classify priority content (which may be objects or groups of objects). The identification and classification of any priority objects may be passed to the streaming server 103.

The streaming server 103 may be configured to receive the generated content from the content server 101 and the identified and classified content from the object priority determiner 115 and transmit the media 122 (which may comprise video and/or audio bit streams with associated metadata such as spatial audio parameters) and furthermore signal priority information 126 based on the identification and classification of any priority objects to a suitable content consuming apparatus 131.

In such a manner the embodiments as described herein are able to set an audio (or other) object to be a priority object with the priority level signalled from streaming server to user equipment. This enables the streaming server 103 to control rendering for the particular object. In some embodiments the signalling of priority objects is not part of the audio-visual media bit stream as such but as an additional control signal (or metadata) that may be inserted into the media stream at the streaming server 103.

In some embodiments the streaming server 103 may be configured to dynamically control rendering. For example, the streaming server 103 control may be based on payments from advertisers and/or urgent safety information requests and priorities associated with objects upgraded or downgraded. Furthermore, in some embodiments the priority levels can be set independently for individual objects (or groups of objects or for content types). Each priority level (which may be e.g. mandatory, recommended, optional or no priority) may be associated with specific actions at rendering.

The system may comprise a content consuming apparatus 131, which may comprise a user equipment as shown in FIG. 1 or any suitable electronic apparatus for rendering and/or presenting the content to the user.

The content consuming apparatus 131 may be configured to receive the media 122 and the priority information 126 and pass this to a suitable media renderer 133. The media renderer may be configured to process the media based on the priority information 126. For example, in some embodiments the renderer 133 is configured to modify the rendering of the content in the following manner:

Render the content based on determined priority zones and associated processing;

Render the content based on priority with parametric spatial audio;

Modify other content during rendering of priority content.

The media renderer 133 in some embodiments is configured to render objects assigned with a lower priority (or having no priority set) such that they are 'pushed' away from the content consumer user so as not to interfere with the experience of higher priority content. In some embodiments this may be implemented by generating a priority order zone around the (possibly moving) content consumer user position. In addition, in some embodiments the media renderer 133 is configured to 'pull' towards the content consumer user any higher priority objects within their respective priority zones when the priority object is located beyond a certain threshold distance from the user.

In some embodiments the media renderer 133 is configured to process the priority signaling in such a way that the priority identification is not limited for discrete objects but can also be defined over groups of objects (and not limited to audio). For example, the rendering based on the priority information can in some embodiments be further based on the position and/or direction of objects relative to the content consumer user (or absolute in the scene). Thus, in some embodiments content in an important (priority) direction/position can be kept locked to the content consumer user view or otherwise prioritized. In some embodiments where the important position has a moving object, it may be tracked based on its content (for example by its spectrogram, etc.).

In some embodiments the media renderer 133 when configured to render an identified priority object is configured such that the object is rendered so that it dominates user's perception, and other content is also modified so that the overall ambiance can be maintained without interfering the consumption of priority content. In such a manner the content consumer user is able to feel still immersed while consuming dominant priority content.

With respect to FIG. 2 is shown an example flow diagram detailing the operations performed within the system as shown in FIG. 1.

In some embodiments the service provider (or content creator) is configured to determine and identify if any priority object(s) are within each scene. In some embodiments these priority objects are assigned into priority classes. The priority classes may be implemented based on legal request (requirements) or other requests (for example to prioritize consumption of advertisements). These operations of determining/identifying priority objects and then assigning them into priority classes is shown in FIG. 2 by step 201.

Furthermore, the streaming server is configured to send priority information (PI) from the streaming server to the renderer in the content consumer apparatus (user equipment). In some embodiments the priority information comprises:

(1) Object identifiers (identifying which object this Priority Information is for); and (2) Priority class.

Furthermore, in some embodiments other attributes may be signalled including:

(3) Priority zone size/radius (and shape);

(4) Trigger condition for the priority treatment;

(5) Duration of the priority treatment;

(6) Priority object effect when triggered; and (7) Effect on other objects when priority object triggered.

The operation of signalling the priority information is shown in FIG. 2 by step 203.

In some embodiments the renderer is configured to obtain a content consumer user orientation (3DoF and 6DoF) and position (6DoF) and generate a suitable rendering based on the received priority information (determining whether at least one priority object is present in the scene). The rendering may be modified based on the priority information.

In some embodiments the modification of the rendering based on priority information may comprise:

(1) Priority zones and associated processing;

(2) Priority with parametric spatial audio (rendering groups of objects based e.g. on position and/or direction); and (3) Modification of other content during rendering of priority content.

Each object (or group of objects) can be assigned a priority status. Typically, priority status is assigned to only to the most important object(s) in a scene. Others (unassigned) are considered as non-prioritized objects.

As discussed above the object or objects priority may be associated with a priority level. There may be several priority levels. For example, there may be four defined levels or classes of priority:

Class 1 ('Mandatory'): An object or objects with this level of priority may be rendered such that the content associated with this object (or objects) is locked to user's view. In some embodiments the locking may furthermore be dependent upon a certain condition being fulfilled. Examples of conditional triggering of the locking may be one of:

a content consumer user entering a defined scene (or area in the scene);

a content consumer user moving to close proximity of the object (within a defined threshold distance to the object);

a content consumer pays attention to the object (for example the user is directed towards the object for a determined time period).

The renderer may be configured to modify the rendering associated with the content locked object by moving the object closer to the content consumer e.g. if its distance from the user is beyond a certain threshold. In some embodiments the content may be unlocked and moved to its original place when a further condition has been met. For example, the content may be unlocked once the content consumer has positively acknowledged the content.

Class 2 ('Recommended'): An object (or objects) with this level of priority may be rendered such that the object 'snaps' into the content consumer user's view (this may also be dependent on a certain condition being fulfilled which may be the same as for Class 1 or other trigger).

However, the rendering may be unlocked for class 2 objects. When the user rotates their head away from the object or moves away (indicating their disinterest), the object will not stay frozen in their view but will return to its original position and orientation.

Class 3 ('Optional'): The object (or objects) with this level of priority may be rendered such that the object (or objects) are highlighted. In some embodiments the highlighting effect is implemented in response to a condition being met which may be the same as for Class 1 or Class 2 or some other trigger condition. However, objects in this class may not be rendered to snap into user's view and are not content locked. The highlighting may be implemented by increasing the audio volume of the object and/or by applying visual effects, or by other ways to draw user's attention to it.

Class 4 ('Not prioritized'): This is the base priority status or no priority status set.

In this example Class 1 has the highest priority and Class 4 the lowest. The above are examples of priority levels and it is understood that there may be more than four or fewer than four classes or levels. Furthermore, in some embodiments there may be sub-levels or sub-classes which divide up the levels or classes.

In some embodiments the media renderer 133 is configured to modify the rendering such that the relative importance of objects is taken into account. For example, in some embodiments the media renderer 133 is configured such that objects having lower priority are 'pushed' away from the content consumer user so not to interfere with higher priority content. Similarly, in some embodiments the media renderer 133 is configured to 'pull' towards the content consumer user any higher priority objects.

In some embodiments this may be implemented by generating a priority order zone for each priority level around the (possibly changing) user position.

In these embodiments any objects with the highest priority are positioned into the highest priority zone and any lower priority objects are re-positioned within their respective priority zones working from the highest to the lowest priority objects.

In some embodiments the media renderer 133 positioning of the objects is implemented by increasing or decreasing the distance between the object and the content consumer user based on the priority of the object, unless a specific effect for the positioning is defined for the priority class (for example the object is associated with locking it into user's view or snapping it into user's view).

With respect to FIG. 3a is shown an example scenario with a user 301 within an immersive environment comprising a first object, object 1 303 and a second object, object 2 305. In these examples object 1 303 is defined as having a higher priority (as signalled to the renderer), for example a class 1 object, than object 2 305 which is a class 4 object. In this example it can be seen that although object 1 is a class 1 object it is 'blocked' at least partially by object 2.

FIG. 3b shows the scenario following the renderer modifying the rendering to re-position objects to respective priority zones. The user 301 is positioned or located within an immersive environment comprising the object 1 (class 2) and the object 2. Furthermore, the renderer may generate a first priority zone, priority zone 1, 311 and a second priority zone, priority zone 2, 312 where the second priority zone forms a concentric region around the first priority zone.

In this example the object 1 is 'pulled' or moved 310 within the first priority zone to position 313 and the object 2 is 'pushed' or moved 316 to the second priority zone position 315. As such the class 1 object is no longer blocked.

FIG. 4a shows a further example with Class 2 Object 1 403 and Class 3 Object 2 405 within an environment with a user 401.

FIG. 4b shows the scenario following the renderer modifying the rendering to re-position objects to respective priority zones. The renderer may generate a first priority zone, priority zone 1, 421 and a second priority zone, priority zone 2, 422 where the second priority zone forms a concentric region around the first priority zone. In this example the object 1 is snapped 412 into view within the first priority zone 421 to position 413 within the view of the user and the object 2 is 'pushed' or moved 414 to the second priority zone 422 position 415 and furthermore highlighted 416.

FIG. 5a shows a further example with Class 1 Object 1 503 and Class 2. Object 2 505 within an environment with a user 501.

FIG. 5b shows the scenario following the renderer modifying the rendering to re-position objects to respective priority zones. The renderer may generate a first priority zone, priority zone 1, 521 and a second priority zone, priority zone 2, 522 where the second priority zone forms a concentric region around the first priority zone. In this example the object 1, being located within the priority zone 1 521 is unmodified but maintained as being locked 504 within the view of the user and the object 2 is 'snapped' or moved 516 to the second priority zone 522 position 515 and within the view of the user.

FIGS. 6a and 6b show a further example comprising more than two priority zones. FIG. 6a shows an example environment with a user 601, and Class 1. Object 1 603 (which is content locked 604), Class 4 Object 2 605 (which is partially blocking object 1), Class 4 Object 3 607, Class 2 Object 4 609 (which initially is not within the user's field of view), Class 3 Object 5 631 and Class 4 Object 6 633.

FIG. 6b shows the scenario following the renderer modifying the rendering to re-position objects to respective priority zones. The renderer may generate a first priority zone, priority zone 1, 611, a second priority zone, priority zone 2, 612, a third priority zone, priority zone 3, 613, and fourth priority zone, priority zone 4, 614 where the fourth priority zone surrounds the third priority zone which further surrounds the second priority zone and which surrounds the first priority zone. In this example the object 1, being located outside priority zone 1 611 is moved to position 613 within the priority zone 1 611 and locked 604 within the view of the user. Object 2 is moved 616 to the priority zone 4 614 position 615. Object 3 is moved 618 to the priority zone 4 614 position 617. Object 4 is snapped into view to position 619 within priority zone 2 612 position 619. Object 5, which was within priority zone 3 613 at position 641 is highlighted 642 and object 6 is maintained in priority zone 4 614 at position 643.

Figure 7:
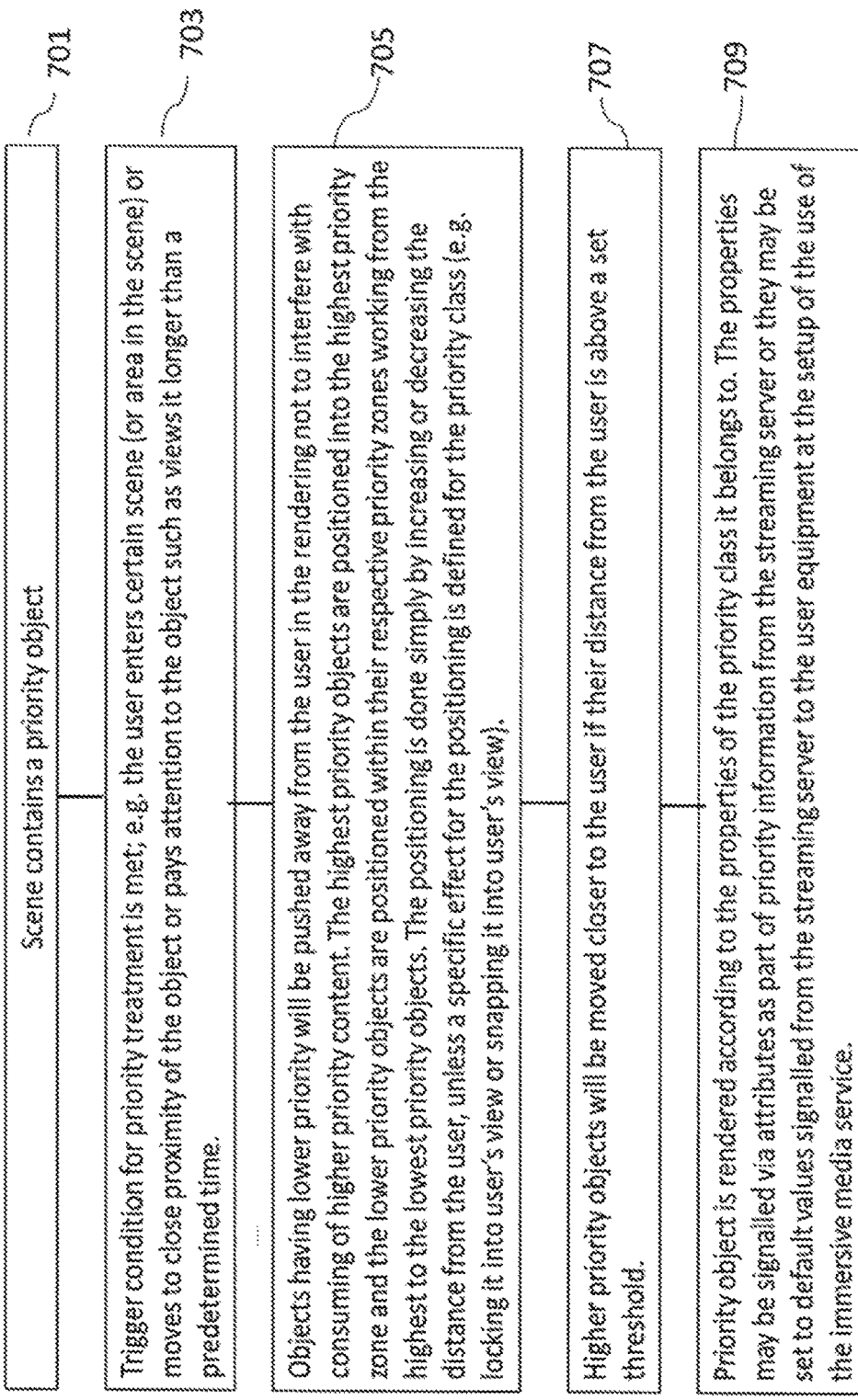
FIG. 7 shows a flow diagram of the operation of implementation of priority zones within the synthesis processor apparatus according to some embodiments.

The operation of the renderer is summarised in FIG. 7.

The first operation is identifying (from the signalling) that the scene or environment comprises at least one object with a priority setting requiring processing as shown in FIG. 7 by step 701.

Furthermore, optionally in some embodiments the renderer determines whether a trigger condition for priority treatment has been met as shown in FIG. 7 by step 703.

Examples of trigger conditions may include proximity to an object, pausing to view and object, entering an area with the object.

The renderer may then be configured to move objects to be within a defined class zone as shown in FIG. 7 by step 705. This movement may include pushing away for lower priority objects or pulling higher priority objects.

Furthermore, in some embodiments the renderer may be configured to move higher priority objects closer to the user where the distance between the user and the object is above a set threshold as shown in FIG. 7 by step 707.

The renderer may then furthermore modify the rendering of the object based on any priority class related behaviour as shown in FIG. 7 by step 709. For example, in some embodiments the Class 1 object is content locked, a Class 2 object may be snapped into view, a Class 3 object may be highlighted.

Priority information such as which object is of which priority class is signalled from the streaming server to the content consumer user so that the user can perform rendering of the objects properly. In this class-based signalling for each object an Object identifier (which object this priority information is for) and priority class (e.g. 1 to 4) value is signalled. In some embodiments one of the classes, for example class 4, may be a default priority class and these are not signalled. Any object received without associated priority information will be treated as belonging to the default (for example the lowest) priority class.

In some embodiments in addition to the class, other attributes (or optional priority information) may be signalled including:
- a priority zone size/radius (and shape)
- a trigger condition for the priority treatment
- a duration (or active period) of the priority treatment
- a priority object effect when triggered
- an effect on other objects when the priority object triggered In some embodiments each of these other attributes furthermore have default values and for those attributes not signalled the default values (built in for each priority class) are used by the renderer. In some embodiments default values may also be signalled once per session (during session initialization at the start of the session) from the streaming server to the renderer.

Although the examples shown in FIGS. 3 to 6 show circle/sphere priority shapes other shapes may be signalled.

Figure 8B:
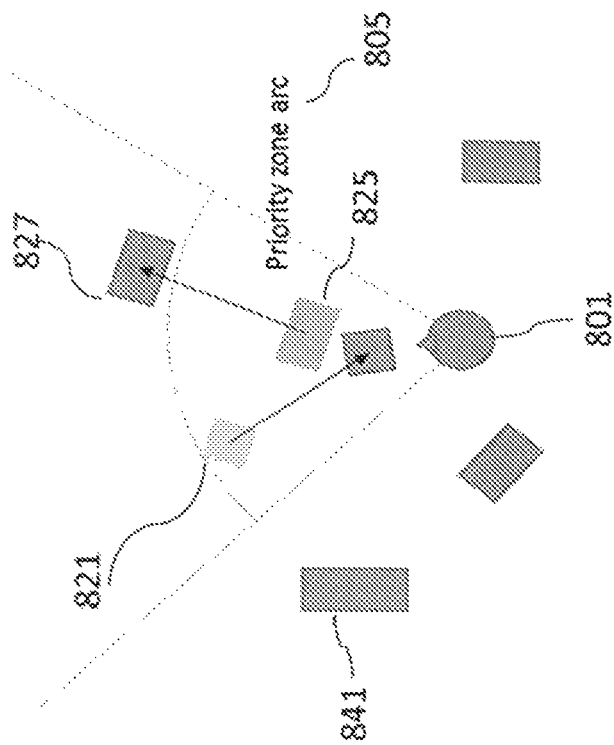
FIGS. 8a and 8b show schematically example priority zone shapes according to some embodiments.
Figure 8A:
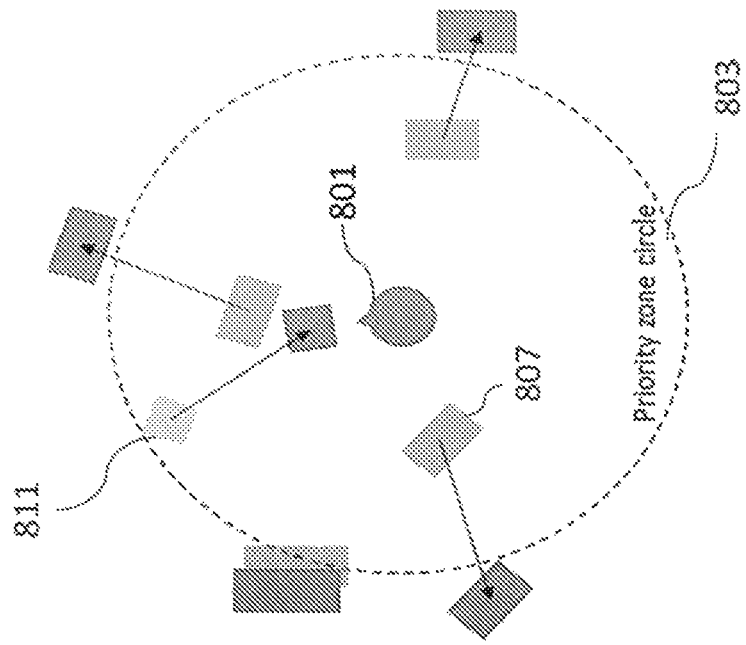

FIGS. 8a and 8b show two examples of the priority zone shape. FIG. 8a shows a circle (or sphere) 803 within which high priority objects 811 are moved into and lower priority objects such as object 807 are moved out of.

FIG. 8b show priority zones of arcs 805 defined by the content consumer user field of view within which high priority objects 821 are moved into and lower priority objects such as object 825 are moved out of. Outside of the field of view the other objects, such as object 841, are un-modified.

The trigger condition attribute may signal to the renderer when to "activate" the priority object. Examples include, distance to priority object from the user is smaller than a threshold distance, the user looks towards the priority object and a certain time from the start of the content has been reached.

The duration attribute may signal to the renderer for how long the priority is active.

An effect on the priority object may be specified. Examples include making the objects louder or less reverberant in the audio object case. For visual objects, examples include making the object more illuminated or larger.

An effect on the other objects than the priority object may be also defined. An effect on the whole scene may be defined as well. One example could be making the whole scene darker so that the priority object is highlighted.

In some embodiments the renderer may be configured to apply this priority approach to parametric spatial audio in addition to discrete objects. In such embodiments suitable grouping of spatial audio content to create ad hoc objects is required In some embodiments this may be implemented by performing context-sensitive source separation for the spatial audio signal. This means that the analysis obtains discrete sources (i.e., objects) from the spatial audio signal and assigns priority to them as desired. This priority can be signalled by adding a time and position cue in addition to the priority for the reproducing system to find out the signal that it should track.

A further approach may be to implement an automatic room-impulse-response (RIR) based method if a dry signal of the priority object is known. This enables complete separation of the source as an object and a simple priority assignment operation.

In some embodiments a direction or position zone in the spatial sound virtual space is created and marked as priority for a certain time cue. This zone can then be regarded as a priority object. If the zone is moved due to priority object modification (i.e., brought to the front of the user), an automatic mapping function can be created to perform the location transformation from the original zone position to the current prioritized zone position. When any time-frequency tile is reproduced from the original zone position, it is automatically moved to the prioritized zone position. This implementation may be further improved by content classification. In some embodiments, where the content at the time instant prioritization starts, is classified, it may be followed through time and thus only move part of the time-frequency tiles rather than all of them.

In some embodiments the renderer is configured to modify the rendering of other content to avoid a modified priority object being renderer such that it dominates user's perception to the extent that content consumer user misses some of the other content (or the other content interferes with the priority object).

In some embodiments the renderer is configured to render the other content to be more reverberant/diffuse (audio) or slightly out of focus (video). This may help the content consumer user focus on the priority object, e.g. for audio the priority object will be the only source heard clearly (dry) and with a specific direction. The other sounds are still audible but less 'focused' and helps the user to not lose immersion in the content even though focus is placed on the priority object.

In some embodiments the renderer is configured to reduce the spectral range of the other content. For example, a low-pass filter (e.g., at 4 kHz corner frequency) can be applied to reduce the "richness" of the other audio content while the priority audio content is playing.

In some embodiments the renderer comprises a compressor applied to the other content when the priority object is active. In such examples the loud signals from the other content are automatically dampened when the priority object has signal present. (This is also known as side-chain compression.)

In some embodiments the renderer is configured to modify the positions and/or directions of the other content to move the other content "out of the way" of the priority content. For example, priority content can create a distinct zone around it that is not allowed for other content and they will be moved away from the priority object to clear the zone.

Figure 9B:
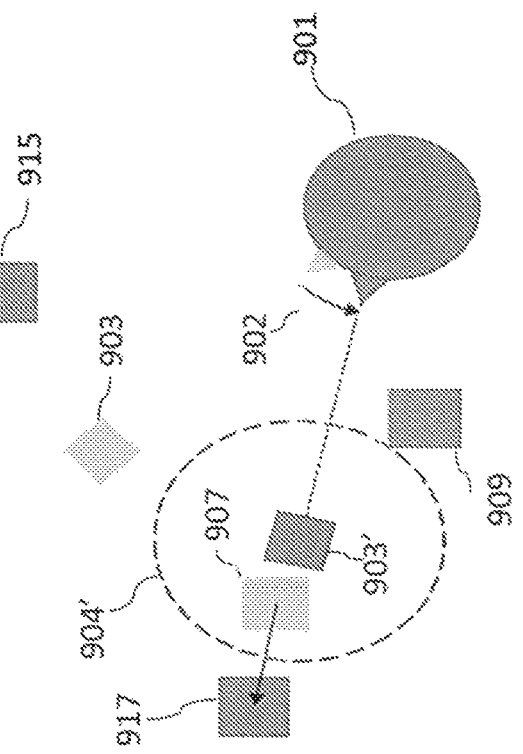
FIGS. 9a and 9b show schematically example rendering implementing priority zone shapes according to some embodiments.
Figure 9A:
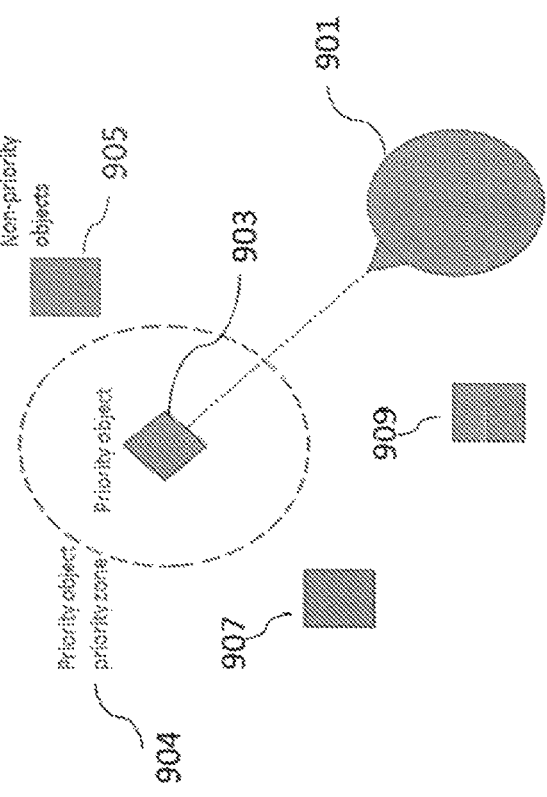

For example, FIGS. 9a and 9b show a priority object 903 and priority object priority zone 904 surrounding the priority object 903. In FIG. 9a the other non-priority objects 905, 907 and 909 are outside of the priority object priority zone 904 and therefore are not modified. In FIG. 9b the content consumer user 901 changes orientation 902 causing the priority object to move to position 903' with moved priority object priority zone 904'. As non-priority object 907 is now within the moved priority object priority zone 904' it is moved to outside of the moved priority object priority zone 904' to position 917.

In some embodiments the other content may be rendered in a loop. If the priority object requires the content consumer user's attention for a longer time, the user might miss some important content happening elsewhere in the scene. Thus, when the system detects that the content consumer user has focused on the priority object for time duration longer than a threshold time, the playback of the other objects skips back to the time when the user started focusing on (e.g. looking at) the priority object. This looping is done until the priority object is no longer in the content consumer user's focus.

The rendering with respect to the other content is shown in FIG. 10.

For example, the renderer is configured to render the dominant priority object content as shown in FIG. 10 by step 1001.

The rendering of the other object content is then modified to that they interfere less with the dominant object as shown in FIG. 10 by step 1003.

Furthermore, in some embodiments the other object content is looped and playback for the other object content is skipped back when the content consumer user is not as focussed on the dominant priority object as shown in FIG. 10 by step 1005.

In some embodiments the server/renderer may employ a priority level quota to aid in rendering content. For example, having ten class 1 priority objects in the scene at the same time would not serve the purpose of bringing attention to the intended content. Thus, for example in some embodiments an example quota for priority objects is set at one class 1 object, one class 2 object, three class 3 objects, and any number of class 4 objects.

In such embodiments the server/renderer is configured to identify when the quota for any class is to overflow and reclassify object priorities temporarily to fit the quota allowances. The quota fulfilment can be implemented automatically in any step of the process. For example, a suitable scheme may be to employ a "first in, first served" quota fulfilment where class quota is filled in order of object introduction. If a quota allocation for a class is full, an object is temporarily demoted to a lower class until the original quota slot is open. In some embodiments this may result in cascaded demotion of objects.

An example of the system as described herein may be when a content consumer user of a VR service (6DoF) enters a scene and sees a legal notice text locked in front of the user while the text is also read out to him from the position of the text. The user moves close to a loud large object in the VR space placing it in between him and the legal notice to avoid seeing and hearing the notice but the loud large object would be pushed away and the user has to view and hear the legal notice. This allows the service provider to satisfy any legal obligations.

Another example would be a VR service (3DoF, 3DoF+ or 6DoF) provider using content locking for legal notices and advertisements to make sure users see/hear them. Users forced to experience advertisements/legal notices locked into their view and which they cannot escape from by turning away or by running away may not achieve the desired effect and cause the user to disengage with the immersive effect. The service provider implements the priority object signaling embodiments as described herein enabling other ways to draw attention to advertisements in rendering than content locking. Customer churn or quitting rates reduce and the advertisement revenue starts to rise.

A further example would be a VR service (6DoF) provider signs new advertisers for products appearing in his VR service 'Walking tour of Tampere'. They update priorities for their products so that they will be highlighted or snapped into a user's view when the user walks close by. Some advertisers have not made their monthly payments and the service provider therefore removes priority status from their products in the VR service.

Additional examples may be while at a shopping mall, the user sees a whole shop including all products in front of the shop being highlighted (easily enabled by priority object signaling using priority position/direction) in the VR or AR service (6DoF). The user starts moving towards the shop.

In summary the concept may be embodied by the following elements/modules:
1. Element 1: Identification of priority content (media objects or groups of objects) and determining their priority class.
2. Element 2: Making renderer aware of (a) what media components are priority components and (b) what is the priority class of each of them ('mandatory priority information'). Making renderer aware of possible other attributes ('optional priority information').
3. Element 3: Modifying the rendering of priority content, or other content, based on the priority information.

In a typical implementation identification of priority content (Element 1) is implemented by the service provider either manually or automatically, priority information is signalled to the renderer operating suitable user equipment (Element 2), and the rendering is modified based on the priority information (Element 3).

This involves signalling priority information between two system components (streaming server and user equipment). The signalling may be defined/standardized to guarantee interoperability between the system components.

In some embodiments identification of priority objects and determining priority attributes may be implemented at the rendering apparatus (at the user equipment). In these embodiments a user is free to define (using the user equipment) what content will be priority content (instead of the service provider). The user may for example define advertisements on certain products that they are interested in to have high priority. This implementation is shown in FIG. 11.

Figure 11:
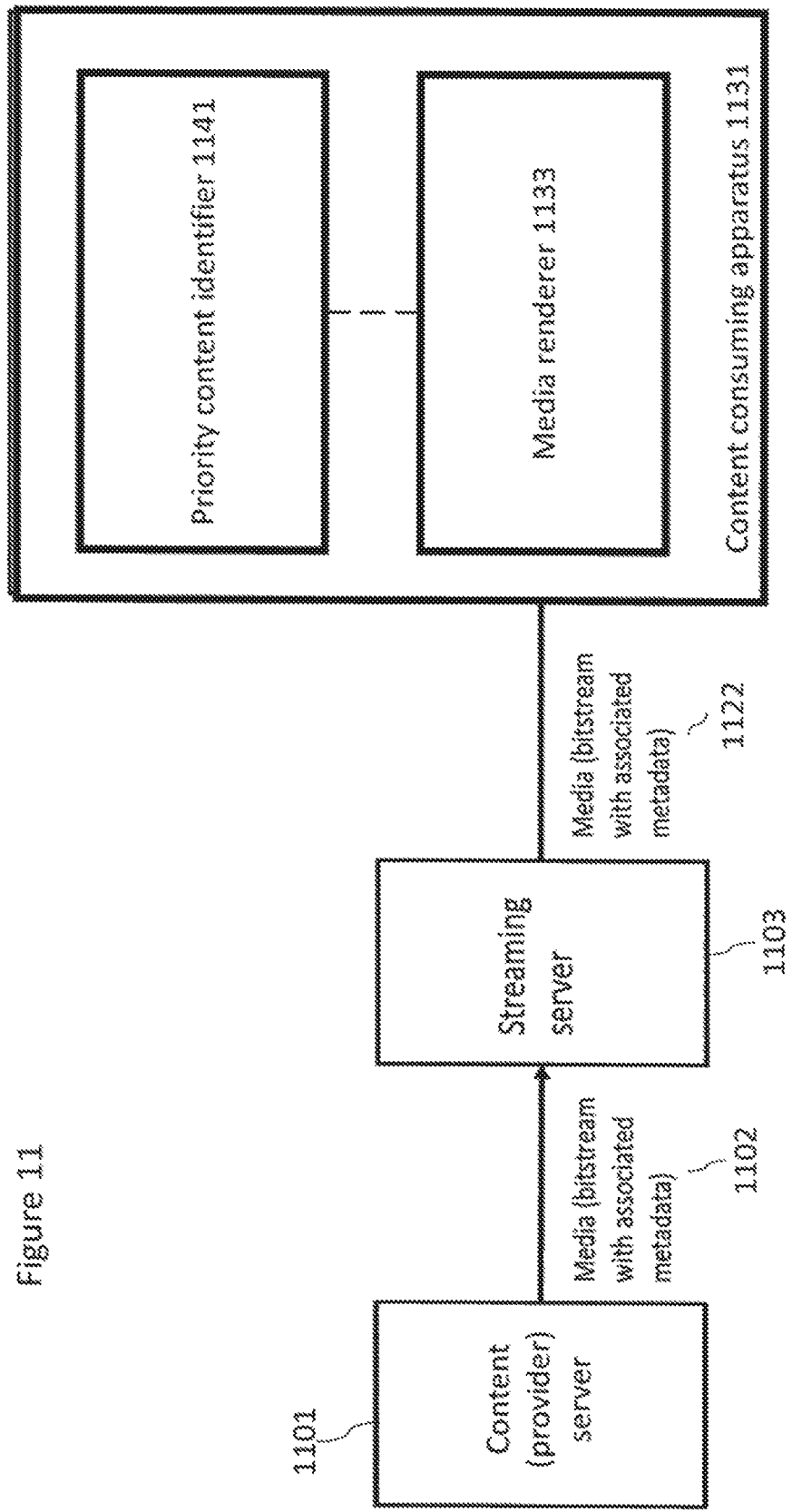
FIG. 11 shows a further example system according to some embodiments.

In FIG. 11 there is shown the content (provider) server 1101 on which the content is generated and a suitable media (bit stream with associated metadata) 1102 passed to the streaming server 1103 which packages the media 1122 to be received by the content consuming apparatus 1131.

The content consuming apparatus 1131 may comprise the media renderer 1133 and the priority content identifier 1141. The priority content identifier 1141 may be configured to assign or associate objects with priority levels in a manner similar to that defined previously. This priority identification signalling may be passed to the media renderer 1133 wherein the objects are rendered in a manner described previously based on the signalled priority information from the priority content identifier 1141.

In some embodiments a service provider may enable the user to set their priority preferences for the service. For example, when the user signs onto the service.

In some embodiments a hybrid implementation which permits setting priority from the service provider and the user is implemented. In other words, rendering modifications may be based on two sets of priority information: one signalled from the service provider and one based on user preferences set locally at the user equipment.

Figure 12:
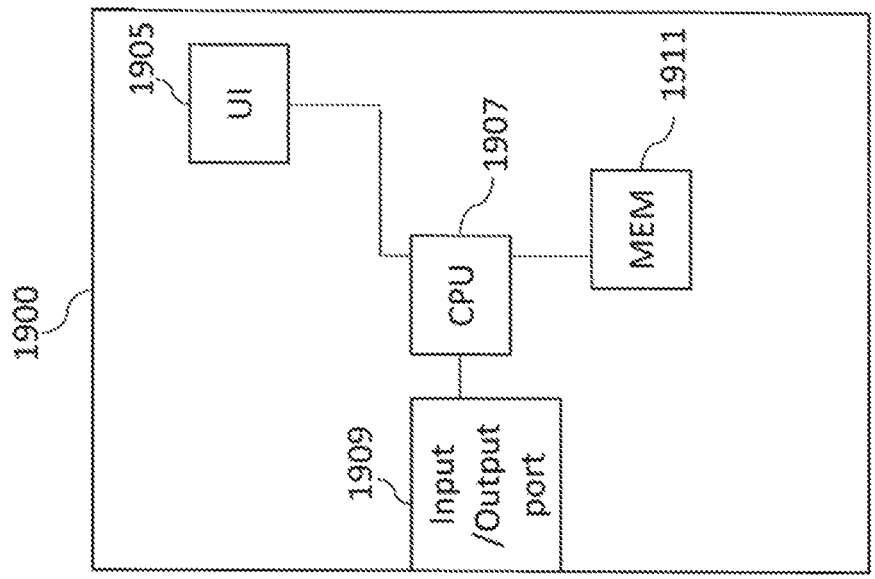
FIG. 12 shows schematically an example device suitable for implementing the apparatus shown.

With respect to FIG. 12 an example electronic device which may be used as the analysis or synthesis device is shown. The device may be any suitable electronics device or apparatus. For example, in some embodiments the device 1900 is a mobile device, user equipment, tablet computer, computer, audio playback apparatus, etc.

In some embodiments the device 1900 comprises at least one processor or central processing unit 1907. The processor 1907 can be configured to execute various program codes such as the methods such as described herein.

In some embodiments the device 1900 comprises a memory 1911. In some embodiments the at least one processor 1907 is coupled to the memory 1911. The memory 1911 can be any suitable storage means. In some embodiments the memory 1911 comprises a program code section for storing program codes implementable upon the processor 1907. Furthermore, in some embodiments the memory 1911 can further comprise a stored data section for storing data, for example data that has been processed or to be processed in accordance with the embodiments as described herein. The implemented program code stored within the program code section and the data stored within the stored data section can be retrieved by the processor 1907 whenever needed via the memory-processor coupling.

In some embodiments the device 1900 comprises a user interface 1905. The user interface 1905 can be coupled in some embodiments to the processor 1907. In some embodiments the processor 1907 can control the operation of the user interface 1905 and receive inputs from the user interface 1905. In some embodiments the user interface 1905 can enable a user to input commands to the device 1900, for example via a keypad. In some embodiments the user interface 1905 can enable the user to obtain information from the device 1900. For example the user interface 1905 may comprise a display configured to display information from the device 1900 to the user. The user interface 1905 can in some embodiments comprise a touch screen or touch interface capable of both enabling information to be entered to the device 1900 and further displaying information to the user of the device 1900.

In some embodiments the device 1900 comprises an input/output port 1909. The input/output port 1909 in some embodiments comprises a transceiver. The transceiver in such embodiments can be coupled to the processor 1907 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1909 may be configured to receive the loudspeaker signals and in some embodiments determine the parameters as described herein by using the processor 1907 executing suitable code. Furthermore the device may generate a suitable transport signal and parameter output to be transmitted to the synthesis device.

In some embodiments the device 1900 may be employed as at least part of the synthesis device. As such the input/output port 1909 may be configured to receive the transport signals and in some embodiments the parameters determined at the capture device or processing device as described herein, and generate a suitable audio signal format output by using the processor 1907 executing suitable code. The input/output port 1909 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising
at least one processor and
at least one non-transitory memory including a computer program code,
the at least one memory and the computer program code configured to, with the at least one processor, cause the apparatus at least to:
obtain media content, wherein the media content comprises at least one object;
obtain priority content information, the priority content information comprising a priority identification identifying and classifying the at least one object; and
render the at least one object based on the priority content information, wherein the at least one object is controlled for rendering within one of at least two priority zones of an immersive environment represented with the media content based, at least partially, on the priority content information, wherein at least one of the at least two priority zones is associated with a priority class.

2. The apparatus as claimed in claim 1, wherein the media content comprises at least one of:
audio content;
video content; or
image content.

3. The apparatus as claimed in claim 1, wherein the media content comprises at least one spatial audio signal which defines an audio scene within which is at least one audio signal object, and wherein the at least one spatial audio signal is configured to be rendered according to a content consumer movement, wherein the priority content information is configured for identifying and classifying the at least one audio signal object, and rendering the at least one object comprises the at least one memory and the computer program code being configured to, with the at least one processor, cause the apparatus to:
render the at least one audio signal object based on the priority content information.

4. The apparatus as claimed in claim 3, wherein the at least one memory and the computer program code are configured to, with the at least one processor, cause the apparatus to:
decode from a first bit stream the at least one spatial audio signal comprising the at least one audio signal object.

5. The apparatus as claimed in claim 4, wherein the at least one memory and the computer program code are configured to, with the at least one processor, cause the apparatus to:
decode from the first bit stream the priority content information.

6. The apparatus as claimed in claim 1, wherein the at least one memory and the computer program code are configured to, with the at least one processor, cause the apparatus to:
obtain the priority content information from a content consumer input.

7. The apparatus as claimed in claim 1, wherein the priority content information comprises at least one of:
an object identifier parameter for identifying which of the at least one object the priority information is for;
a priority class parameter for classifying the at least one object with respect to identifying a rendering effect to be applied to the at least one object;
a priority zone size parameter for defining a scene priority zone size associated with the rendering effect to be applied to the at least one object;
a priority zone radius parameter for defining a scene priority zone radius associated with the rendering effect to be applied to the at least one object;
a priority zone shape parameter for defining a scene priority zone shape associated with the rendering effect to be applied to the at least one object;
a trigger condition parameter for defining at least one criteria to meet before applying the rendering effect to the at least one object;
a duration parameter for defining a duration over which the rendering effect can be applied to the at least one object;
a priority object effect parameter defining the rendering effect to be applied to the at least one object; or
an other object effect parameter defining a rendering effect to be applied to another of the at least one object when the rendering effect is applied to the at least one object.

8. The apparatus as claimed in claim 1, wherein the at least one memory and the computer program code are configured to, with the at least one processor, cause the apparatus to:
define the at least two priority zones.

9. The apparatus as claimed in claim 1, wherein rendering the at least one object based on the priority content information comprises the at least one memory and the computer program are configured to, with the at least one processor, cause the apparatus to:
move the at least one object from a first of the at least two priority zones to another of the at least two priority zones based on the priority content information, wherein the at least two priority zones comprise respective regions of the immersive environment surrounding a content consumer in the immersive environment.

10. The apparatus as claimed in claim 1, wherein the priority content information comprises at least one of:
a first level, wherein an object, of the at least one object, associated with the first level is content locked to a content consumer's field of view;
a second level, wherein an object, of the at least one object, associated with the second level is moved to the content consumer's field of view;

a third level, wherein an object, of the at least one object, associated with the third level is highlighted when in the content consumer's field of view; or
a fourth default level, wherein an object, of the at least one object, associated with the fourth level is not modified based on its priority level.

11. An apparatus comprising
at least one processor and
at least one non-transitory memory including a computer program code, the at least one memory and the computer program code configured to, with the at least one processor, cause the apparatus at least to:
obtain media content, wherein the media content comprises at least one object;
obtain priority content information, the priority content information comprising a priority identification identifying and classifying the at least one object; and
generate a data stream, the data stream comprising the media content and the priority content information, wherein the data stream is configured to be transmitted to and/or retrieved with a renderer configured to render the at least one object based on the priority content information, wherein the at least one object is configured to be controlled for rendering within one of at least two priority zones of an immersive environment represented with the media content based, at least partially, on the priority content information, wherein at least one of the at least two priority zones is associated with a priority class.

12. The apparatus as claimed in claim 11, wherein the media content comprises at least one of:
audio content;
video content; or
image content.

13. The apparatus as claimed in claim 11, wherein the media content comprises at least one spatial audio signal which is configured to be rendered according to a content consumer movement and defines an audio scene within which is at least one audio signal object, and wherein the priority content information is configured for identifying and classifying the at least one audio signal object, wherein the renderer is configured to render the at least one audio signal object based on the priority content information.

14. A method comprising:
obtaining media content, wherein the media content comprises at least one object;
obtaining priority content information, the priority content information comprising a priority identification identifying and classifying the at least one object; and
generating a data stream, the data stream comprising the media content and the priority content information, wherein the data stream is configured to be transmitted to and/or retrieved with a renderer configured to render the at least one object based on the priority content information, wherein the at least one object is configured to be controlled for rendering within one of at least two priority zones of an immersive environment represented with the media content based, at least partially, on the priority content information, wherein at least one of the at least two priority zones is associated with a priority class.

15. The method as claimed in claim 14, wherein the media content comprises at least one spatial audio signal which defines an audio scene within which there is at least one audio signal object, and wherein the at least one spatial audio signal is configured to be rendered according to a content consumer movement, wherein the priority content information is configured for identifying and classifying the at least one audio signal object, and wherein the rendering of the at least one object comprises rendering the at least one audio signal object based on the priority content information.

16. The method as claimed in claim 14, further comprising:
defining the at least two priority zones.

17. The method as claimed in claim 14, wherein the rendering of the at least one object based on the priority content information further comprises:
moving the at least one object from a first of the at least two priority zones to another of the at least two priority zones based on the priority content information.

18. The method as claimed in claim 14, wherein the obtaining of the priority content information comprises obtaining the priority content information from a content consumer input.

19. A method comprising:
generating media content, wherein the media content comprises at least one object;
obtaining priority content information, the priority content information comprising a priority identification identifying and classifying the at least one object; and
signalling the media content and/or the priority content information, wherein the media content and the priority content information are configured to be transmitted to and/or retrieved with a renderer configured to render the at least one object based on the priority content information, wherein the at least one object is configured to be controlled for rendering within one of at least two priority zones of an immersive environment represented with the media content based, at least partially, on the priority content information, wherein at least one of the at least two priority zones is associated with a priority class.

20. The method as claimed in claim 19, wherein the media content comprises at least one spatial audio signal which is configured to be rendered according to a content consumer movement and defines an audio scene within which there is at least one audio signal object, and wherein the priority content information is configured for identifying and classifying the at least one audio signal object, wherein the renderer is configured to render the at least one audio signal object based on the priority content information.

* * * * *